United States Patent
Choi et al.

(10) Patent No.: US 9,087,238 B2
(45) Date of Patent: Jul. 21, 2015

(54) DEVICE AND METHOD FOR IRIS RECOGNITION USING A PLURALITY OF IRIS IMAGES HAVING DIFFERENT IRIS SIZES

(75) Inventors: Hyeong In Choi, Seoul (KR); Dae Hoon Kim, Seoul (KR); Jung Kyo Sohn, Seoul (KR); Song Hwa Kwon, Bucheon (KR); Sung Jin Lee, Seoul (KR); Hwan Pyo Moon, Anyang (KR); Seung Min Paik, Seoul (KR)

(73) Assignee: Iritech Inc., Fairfax, VA (US)

( * ) Notice: Subject to any disclaimer, the term of this patent is extended or adjusted under 35 U.S.C. 154(b) by 437 days.

(21) Appl. No.: 13/522,948

(22) PCT Filed: Jan. 22, 2010

(86) PCT No.: PCT/KR2010/000404
§ 371 (c)(1),
(2), (4) Date: Jul. 18, 2012

(87) PCT Pub. No.: WO2011/090225
PCT Pub. Date: Jul. 28, 2011

(65) Prior Publication Data
US 2013/0063582 A1    Mar. 14, 2013

(51) Int. Cl.
H04N 7/18 (2006.01)
G06K 9/00 (2006.01)

(52) U.S. Cl.
CPC ........ G06K 9/00617 (2013.01); G06K 9/00604 (2013.01)

(58) Field of Classification Search
CPC ............ G06K 9/00597; G06K 9/0061; G06K 9/00604; G06K 9/00617
USPC .............. 348/78; 382/117; 351/206, 221, 239
See application file for complete search history.

(56) References Cited

U.S. PATENT DOCUMENTS 6,714,665 B1 * 3/2004 Hanna et al. .................. 382/117
7,519,828 B2 * 4/2009 Kittler et al. .................. 713/186

(Continued)

FOREIGN PATENT DOCUMENTS

KP    10-2010-0083482 A    7/2010
KR    10-2002-0028146      4/2002

(Continued)

OTHER PUBLICATIONS

PCT International Search Report for PCT Counterpart Application No. PCT/KR2010/000404 containing Communication relating to the Results of the International Search Report, 5 pages, (Oct. 25, 2010).
PCT Written Opinion of the International Searching Authority for PCT Counterpart Application No. PCT/KR2010/000404, 12 pages, (Oct. 25, 2010).

(Continued)

*Primary Examiner* — Victor Kostak
(74) *Attorney, Agent, or Firm* — Blakely, Sokoloff, Taylor & Zafman LLP

(57) ABSTRACT

The present invention relates to an iris recognition device and method capable of improving iris recognition accuracy. To enhance iris recognition accuracy in consideration of variation in pupil size and iris region due to changes in intensity of lighting, the iris recognition device and method are configured to obtain multiple iris images having different iris sizes by capturing iris images of a person to be enrolled with a camera while adjusting brightness of lighting so that the iris size of the person to be enrolled varies from a maximum size to a minimum size, store the obtained iris images and associated iris size information for enrollment in a database interworking with the iris recognition device, and select enrolled iris images having an iris size most similar to that of an iris image captured by the camera for identification among many enrolled iris images for similarity measurement.

15 Claims, 5 Drawing Sheets

(56) References Cited

U.S. PATENT DOCUMENTS

| | | | |
|---|---|---|---|
| 8,014,571 B2* | 9/2011 | Friedman et al. | 382/117 |
| 2003/0012413 A1* | 1/2003 | Kusakari et al. | 382/117 |
| 2004/0037452 A1* | 2/2004 | Shin | 382/117 |
| 2006/0147094 A1* | 7/2006 | Yoo | 382/117 |
| 2007/0100217 A1* | 5/2007 | Proniewicz et al. | 600/319 |
| 2008/0044063 A1* | 2/2008 | Friedman et al. | 382/117 |
| 2008/0273173 A1* | 11/2008 | Grotehusmann et al. | 351/206 |
| 2008/0277601 A1* | 11/2008 | Phinney et al. | 250/505.1 |
| 2009/0296996 A1* | 12/2009 | Kondo et al. | 382/117 |
| 2010/0290668 A1* | 11/2010 | Friedman et al. | 382/103 |
| 2011/0149239 A1* | 6/2011 | Neal et al. | 351/205 |

FOREIGN PATENT DOCUMENTS

| | | |
|---|---|---|
| KR | 10-0373850 B1 | 2/2003 |
| KR | 10-2003-0051970 A | 6/2003 |
| KR | 10-0472563 B1 | 2/2005 |
| KR | 10-2006-0081380 | 7/2006 |

OTHER PUBLICATIONS

PCT Notification concerning Transmittal of International Preliminary Report on Patentability, (Chapter I of the Patent Cooperation Treaty) for PCT Counterpart Application No. PCT/KR2010/000404, 15 pages, (Aug. 2, 2012).

* cited by examiner

DEVICE AND METHOD FOR IRIS RECOGNITION USING A PLURALITY OF IRIS IMAGES HAVING DIFFERENT IRIS SIZES

CROSS-REFERENCE TO RELATED APPLICATION

This patent application is a U.S. National Phase Application under 35 U.S.C. §371 of International Application No. PCT/KR2010/000404, filed Jan. 22, 2010, entitled DEVICE AND METHOD FOR IRIS RECOGNITION USING A PLURALITY OF IRIS IMAGES HAVING DIFFERENT IRIS SIZES, which is hereby incorporated by reference for all purposes.

FIELD

The present invention relates to an iris recognition device and method using multiple iris images having different iris sizes wherein, to improve iris recognition accuracy in consideration of the iris region changing with pupil size variation in response to changes in intensity of lighting, multiple iris images having different iris sizes are obtained by capturing iris images (also referred to as "iris snapshots") of a person to be enrolled with a camera while adjusting brightness of lighting so that the pupil size of the person to be enrolled varies from a maximum size to a minimum size, the obtained iris images and associated iris size information are stored together for enrollment in a database interworking with the iris recognition device (iris images stored in a database for enrollment are referred to as "enrolled iris images"), and, for an iris image captured for authentication or identification (referred to as an "iris image for identification"), enrolled iris images having an iris size most similar to the iris size of the iris image for identification are selected among many enrolled iris images having different iris sizes and compared.

BACKGROUND

Related art iris recognition devices, which lack appropriate mechanisms to compensate for pupil size variations in response to changes in intensity of lighting, tend to have poor iris recognition accuracy owing to changes in iris images caused by pupil size variation.

As a related art technique, a patent application filed by the applicant of the present invention and disclosed in Korean Patent Laid-Open Gazette No. 10-2006-81380 provides an invention that is related to the present invention but differs in terms of subject matter. The related art invention relates to a mobile terminal having a stereo camera that is configured to capture images suitable for face recognition and/or iris recognition. The stereo camera is used to compensate for image size differences in consideration of the distance between the face and the camera. However, the related art invention deals with subject matters different from those of the present invention, and may increase device volume and cost owing to mounting of a stereo camera.

A patent application disclosed in Korean Patent Laid-Open Gazette No. 10-2002-28146 provides another related art technique, in which the pupil radius changing according to brightness of lighting is divided into one or more classes. Multiple iris images of individual persons are classified according to pupil radius classes and stored for enrollment, and an iris image captured for identification is compared with enrolled iris images. Although this related art technique is similar to the present invention in use of pupil radius, it fails to provide a means for efficiently utilizing identification information and iris size information stored in iris images, imposing restrictions on improvements in iris recognition accuracy and processing speed.

SUMMARY

The present invention has been conceived to solve the above problems of the related art as described above, and an objective of the present invention is to improve iris recognition accuracy by capturing multiple iris images having different iris sizes with a camera of an iris recognition device while adjusting brightness of lighting so that the pupil size of a person to be enrolled varies from a maximum size to a minimum size, storing the obtained iris images and associated iris size information for enrollment in a database interworking with the iris recognition device, and selecting enrolled iris images having an iris size similar to that of an iris image captured for identification to conduct similarity measurement.

Another objective of the present invention is to reduce additional expenses that are required to equip illumination equipment to maintain a desired range of illumination intensity by preventing degradation of iris recognition accuracy that may be caused by variations in illumination according to the place at which the iris recognition device is installed, and flexibly coping with surroundings in which the iris recognition device is installed.

A further objective of the present invention is to increase data processing speed by selecting, for similarity measurement, only enrolled iris images having an iris size similar to that of an iris image captured for identification among numerous enrolled iris images stored in a database to thereby reduce the number of comparisons needed for identification.

One aspect of the invention provides an iris recognition device and method using multiple iris images having different iris sizes, wherein, to improve iris recognition accuracy in consideration of the iris region changing with pupil size variations in response to changes in intensity of lighting, multiple iris images having different iris sizes are obtained by capturing iris images (also referred to as "iris snapshots") of a person to be enrolled with a camera while adjusting brightness of lighting so that the pupil size of the person to be enrolled varies from a maximum size to a minimum size, the obtained iris images and associated iris size information are stored together for enrollment in a database (referred to as an "iris enrollment database") interworking with the iris recognition device (iris images stored in the iris enrollment database are referred to as "enrolled iris images"), and, for an iris image captured for authentication or identification (referred to as an "iris image for identification"), enrolled iris images having an iris size similar to the iris size of the iris image for identification are selected among many enrolled iris images having different iris sizes to conduct similarity measurement with a view to high iris recognition accuracy.

Another aspect of the invention provides an iris recognition device and method using multiple iris images having different iris sizes aimed at high iris recognition accuracy, wherein multiple iris images having different iris sizes are obtained using an installed camera, after the pupils of a person to be enrolled who is sitting on a given chair at a shooting site dilate or constrict for a while to adapt to intensity of ambient lighting, by capturing iris images of the person to be enrolled looking right at the camera while adjusting brightness of illumination using flash or visible light so that the iris size of the person to be enrolled varies from a maximum size to a minimum size, the obtained iris images and associated iris size information are stored together in the iris enrollment database, and the stored iris images are used to achieve high iris recognition accuracy.

A further aspect of the invention provides an iris recognition device and method that achieve high data processing efficiency through approximation during identification wherein iris images captured for enrollment are classified according to iris size and stored in the iris enrollment database to form sets of enrolled iris images having similar iris sizes so that only enrolled iris images having an iris size similar to that of an iris image for identification are selected among many enrolled iris images, or a representative iris contraction ratio is set so as to reduce the number of iris images to be compared.

As a feature of the present invention, multiple iris images having different iris sizes are obtained by capturing iris images of a person to be enrolled with a camera while adjusting brightness of lighting so that the iris size of the person to be enrolled varies from a maximum size to a minimum size, the obtained iris images and associated iris size information are stored together in the iris enrollment database, and enrolled iris images having an iris size similar to the iris size of an iris image for identification are selected to conduct similarity measurement, thereby enhancing iris recognition accuracy.

As another feature of the present invention, it is possible to reduce additional expenses that are required to equip illumination equipment to maintain a desired range of illumination intensity by preventing degradation of iris recognition accuracy that may be caused by variation in illumination according to the place at which the iris recognition device is installed, and by flexibly coping with surroundings in which the iris recognition device is installed.

As yet another feature of the present invention, for similarity measurement, only enrolled iris images having an iris size similar to that of an iris image for identification are selected among many iris images stored in the iris enrollment database, thereby reducing the number of iris images to be compared. Hence, it is possible to increase data processing efficiency during identification.

<Description of Reference Symbols for Major Parts of Drawings>

11: pupil radius (inner iris radius) 12: outer iris radius

DETAILED DESCRIPTION

A best mode for carrying out the invention is to realize an iris recognition device and method using multiple iris images having different iris sizes, wherein, to improve iris recognition accuracy in consideration of the iris region changing with pupil size variations in response to changes in intensity of lighting, multiple iris images having different iris sizes are obtained by capturing iris images of a person to be enrolled with a camera while adjusting brightness of lighting so that the iris size of the person to be enrolled varies from a maximum size to a minimum size. The obtained iris images and associated iris size information are stored together in an iris enrollment database interworking with the iris recognition device, and enrolled iris images having an iris size similar to the iris size of an iris image captured for identification are selected among many enrolled iris images having different iris sizes to conduct similarity measurement.

Another best mode for carrying out the invention is to realize an iris recognition device and method that achieve high data-processing efficiency through approximation during identification wherein iris images captured for enrollment are classified according to iris size and stored in the iris enrollment database to form sets of enrolled iris images having similar iris sizes so that only enrolled iris images having an iris size similar to that of an iris image for identification are selected among many enrolled iris images, or a representative iris contraction ratio is set so as to reduce the number of iris images to be compared.

MODE FOR INVENTION

Figure 1:
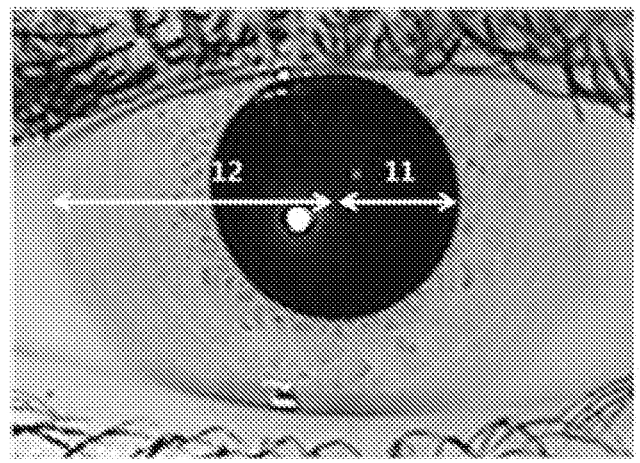
FIG. 1 illustrates an iris image captured by a camera.

Embodiments of the present invention are described in detail with reference to the accompanying drawings. FIG. 1 is a photograph of an iris to illustrate an iris structure. In the iris structure of FIG. 1, the pupil is at the center, the iris surrounds the pupil, and the white sclera surrounds the iris.

Figure 2:
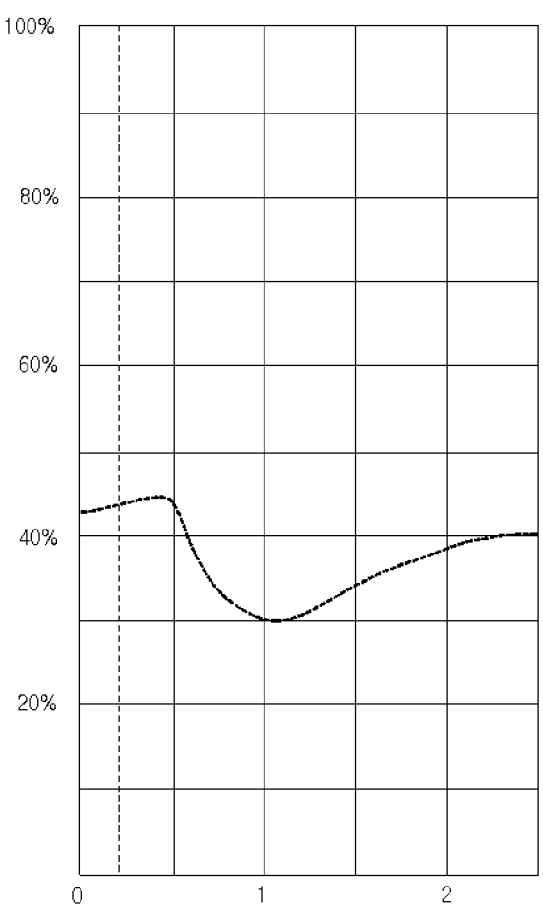
FIG. 2 depicts changes in the pupil size with time after transition from a bright illumination state to a blocked illumination state.
Figure 3:
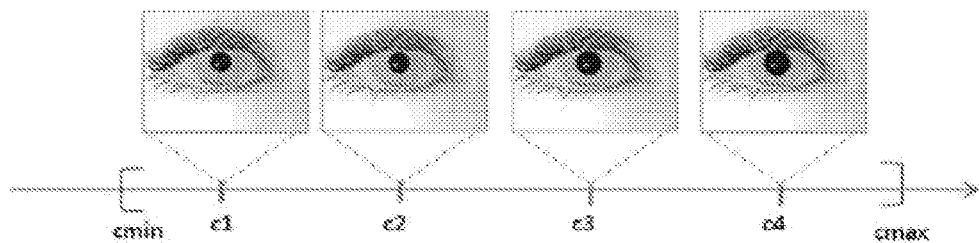
FIG. 3 illustrates iris images with iris constriction and dilation according to brightness of illumination.
Figure 4:
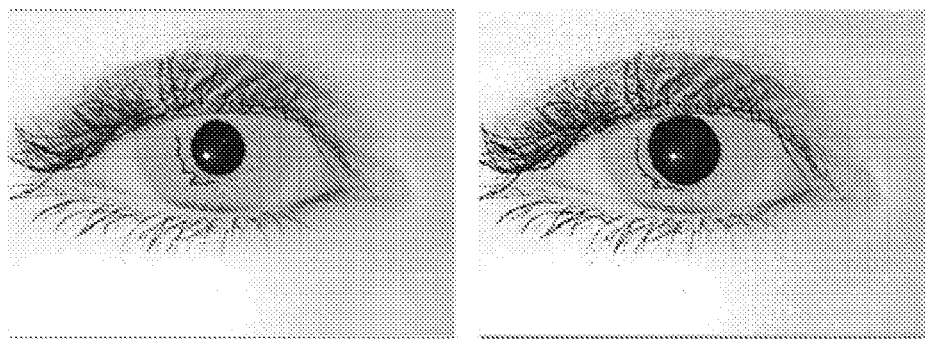
FIG. 4 illustrates changes in a distinctive pattern when the pupil is constricted and when the pupil is dilated.

Next, a description is given of physiological phenomena of the iris. FIGS. 2, 3 and 4 are drawings to illustrate physiological phenomena of the human iris. FIG. 2 depicts changes in the pupil size with time after intensity of illumination is changed from a high illumination state to a low illumination state in the shooting environment. FIG. 2 indicates that the pupil size may change by up to 10 percent with the passage of time after intensity of illumination is changed from a high illumination state to a low illumination state. When iris images are compared to measure similarity therebetween without respect to changes in the iris region due to such pupil size variation (for ease of description, it is assumed that similarity has a value of 0 to 1 and a similarity of 1 indicates the highest level of similarity), although a first iris image with a maximum pupil size and a second iris image with a minimum pupil size are captured from the same person, similarity between the first iris image and the second iris image may be significantly smaller than 1, leading to a determination that the first iris image and the second iris image are not similar. This may cause an error in iris identification.

Pupil size variations and their effects are described further with reference to FIGS. 3 and 4. FIG. 3 illustrates iris images captured from the same person, where the iris region of the iris images is constricted or dilated according to brightness of illumination. FIG. 4 depicts changes in a distinctive pattern when the iris is constricted or dilated owing to pupil size variation. FIG. 4 shows a portion of a virtual boundary of the distinctive pattern spreading outwards from the pupil boundary and shows how the virtual boundary varies with iris constriction and dilation. It can be seen that the virtual boundary becomes rougher as pupil size becomes smaller.

Deformation of the iris region due to pupil constriction or dilation is not the same for all persons, and is not homogeneous even at all sites in the iris region of the same person.

This non-homogeneity indicates that deformation in the iris region differs according to internal dilation or constriction and deformation does not occur to the same extent at all sites of the iris region. In particular, an experiment can reveal that the amount of dilation or constriction is greater at an iris portion near the pupil than at an iris portion far from the pupil.

Next, a description is given of iris shapes. The iris region has a round band shape on the whole, and shares a boundary inwardly with the pupil (referred to as "inner boundary") and shares a boundary outwardly with the white sclera (referred to as "outer boundary"). The inner boundary and the outer boundary have a shape of a circle or ellipse. More precisely, the two boundaries are a closed curve surrounding the convex inside. The shape of an iris surrounded by the inner boundary and the outer boundary may be described as follows:

Using one of various edge detection schemes used in image processing, the inner boundary of the iris is found, and the center thereof (referred to as "pupil center" and indicated by 'O') is determined. The pupil center may be found by assuming that the inner boundary is a circle or ellipse. Then, the outer boundary of the iris is found using the edge detection scheme. Considering a half line that originates from the pupil center O and forms an angle t with the positive direction of the x-axis, the distance between the pupil center O and the intersection point at which the half line meets the inner boundary is indicated by r(t) (referred to as "inner radius for angle t"), and the distance between the pupil center O and the intersection point at which the half line meets the outer boundary is indicated by R(t) (referred to as "outer radius for angle t").

It is possible to completely describe the iris shape using a set of all pairs of the inner radius and outer radius (r(t), R(t)) for all angles t. However, as the iris tends to be hidden by the eyelid and eyelashes in a given eye image, it is difficult to obtain the whole set. Additionally, considering the size of the above set, it is not efficient for an iris recognition device to possess the set.

In the event that both the inner boundary and outer boundary are circles with the same center, one pair (r, R) (inner radius r, and outer radius R) is sufficient to determine an iris shape used in the present invention. In the event that both the inner boundary and outer boundary are ellipses with the same center, two pairs (a, A) and (b, B) indicating the major axis length (inner a, outer A) and the minor axis length (inner b, outer B) are sufficient to determine an iris shape.

Next, a description is given of the iris contraction ratio. A noteworthy phenomenon in FIG. 3 or FIG. 4 is that the outer boundary of the iris region is nearly fixed while the pupil size changes. Hence, to represent the iris size, instead of using a pair of the inner iris radius and outer iris radius (r(t), R(t)), the ratio r(t)/R(t) of the inner iris radius to the outer iris radius, a value obtained by dividing the inner iris radius by the outer iris radius, is used. This ratio is unrelated in theory with changes in shooting conditions such as the distance between the camera and target object and a zoom level of the camera lens, and is also unrelated with changes in image resolution or size. The ratio r(t)/R(t) of the inner iris radius to the outer iris radius is invariant independently of iris images for a fixed iris state. The ratio r(t)/R(t) of the inner iris radius to the outer iris radius (referred to as "iris contraction ratio at angle t" and denoted by c(t)) becomes a numerical value between 0 and 1 by definition.

As the iris contraction ratio becomes larger, the pupil size becomes larger and the iris region size becomes smaller. In FIG. 4, the iris contraction ratio of the left image is about 0.5, and the iris contraction ratio of the right image is about 0.6.

When the iris recognition device manages iris contraction ratios c(t) for all t, management efficiency is lowered and processing speed is lowered owing to a large number of iris images to be compared. Hence, it is preferable to use one or more representative iris contraction ratios by selecting one or more representative values from the iris contraction ratios c(t). For example, when both the inner boundary and outer boundary are assumed to be circular, as iris contraction ratios c(t) are the same for all t, one of the iris contraction ratios c(t) may be a representative iris contraction ratio. When both the inner boundary and outer boundary are not assumed to be circular, the average of several iris contraction ratios may be a representative iris contraction ratio. For example, when both the inner boundary and outer boundary are assumed to be elliptical with major axis length 'a' and minor axis length 'b' for the inner boundary and with major axis length 'A' and minor axis length 'B' for the outer boundary, the average of the major axis length ratio and the minor axis length ratio, (a/A+b/B)/2, may be determined as a representative iris contraction ratio.

In one embodiment, for ease of description, only one representative iris contraction ratio is used for a given iris snapshot. In the following description, such representative iris contraction ratio is denoted by 'c'. Although the iris contraction ratio may be used in various forms, using the iris contraction ratio according to the intent of the present invention, enhancement of iris recognition accuracy through comparison between iris images having similar iris sizes, will fall within the scope of the present invention.

For the iris of a given person, the iris contraction ratio may vary within a certain range. When the maximum iris contraction ratio and minimum iris contraction ratio that a typical person may have in theory are denoted respectively by cmax and cmin, the iris contraction ratio of a person belongs to an interval [cmin, cmax]. Each value 'c' belonging to the iris contraction ratio range of a person corresponds uniquely to a particular iris state of the person. The iris state of the person corresponding to a given value 'c' does not change with time. In the following description, for a person to be photographed H (a person to be enrolled is mainly denoted by H and a person to be identified is mainly denoted by G), the iris at iris contraction ratio 'c' is denoted by I(H;c), the set of iris states corresponding to a set C included in the theoretical iris contraction ratio range [cmin, cmax] is denoted by I(H;C).

In addition, for a person to be photographed H, the set of iris states corresponding to the theoretical iris contraction ratio range [cmin, cmax] is denoted by I(H). As cmin and cmax are theoretical minimum and maximum iris contraction ratios for all persons, iris states of a particular person H corresponding to cmin and cmax may be not present in the set I(H). Although images captured from an iris may differ depending upon shooting conditions, for ease of description, I(H;c) is regarded as indicating not only an iris state of a person to be photographed H at iris contraction ratio c but also an iris image captured at the iris state. The same applies to I(H;C) and I(H). In other words, when I(H) is regarded as a set of iris images, it is obtained by successively photographing all iris states, I(H;c) is an iris snapshot for an iris state at iris contraction ratio c, and I(H;C) is also a set of iris snapshots for an iris contraction ratio set C. In consideration of dynamic aspects of the iris region, an iris image is also referred to as an iris snapshot in an embodiment of the present invention.

Next, a description is given of acquisition of iris images. To improve an iris recognition method that does not consider iris region changes caused by pupil size variations due to changes in intensity of lighting, multiple iris images having different pupil sizes are obtained by capturing iris images of a person to be enrolled at regular intervals with a camera so that the pupil size of the person to be enrolled varies from a maximum size to a minimum size.

A description is given of a procedure to obtain multiple iris images with respect to iris region changes and pupil size variation due to changes in lighting intensity. A camera to capture iris images for enrollment is prepared at a site where illumination adjustment facilities are equipped. A chair for a person to be enrolled is placed at a selected location. The camera is installed so that the height thereof may be adjusted according to the eye height of a person to be enrolled sitting on the chair. Illumination equipment is configured so as to interwork with camera work.

Thereafter, a person to be enrolled is introduced to the shooting site and is seated on the chair. Some time is provided to allow the pupils of the person to be enrolled seated on the chair to dilate or constrict as adaptation to intensity of ambient lighting. At a suitable time for photographing, the person to be enrolled is instructed to look right at the installed camera and an iris image of the person to be enrolled is captured instantly by the camera under bright illumination using flash or visible light. Multiple iris images having different pupil sizes are captured while adjusting brightness of illumination to change the pupil size.

For one person to be enrolled (H), k iris images are obtained according to the above procedure. Pairs of inner iris radius and outer iris radius extracted from the obtained k iris images are referred to as $(r_1, R_1), (r_2, R_2), \ldots,$ and $(r_k, R_k)$. Iris contraction ratios $(r_1/R_1, r_2/R_2, \ldots, r_k/R_k)$, which are independent of resolutions and sizes of iris images as described before, are computed.

Let the above iris contraction ratios be $c_1, c_2, \ldots, c_k$, and let $C=\{c_1, c_2, \ldots, c_k\}$. Then, for the person to be enrolled H, a set of iris snapshots $I(H;C)=\{I(H;c_1), \ldots, I(H;c_k)\}$ may be obtained.

For example, when two iris snapshots shown in FIG. 4 are used for enrollment of a person H, I(H;0.5) and I(H;0.6) are used to enroll the person H.

Next, a description is given of selection of iris snapshots to be used for enrollment. Obtained iris snapshots are assumed to be useful images. That is, it is assumed that poor-quality iris snapshots, such as images affected by noise or shaking, or out of focus or unclear images, are already removed. The iris snapshots may be used as iris images for enrollment to be stored in an iris enrollment database or storage without selection, or some of the iris snapshots may be selected and only the selected iris images may be used as iris images for enrollment. The reason to select some of obtained iris snapshots of a person to be enrolled is to enhance efficiency of comparison between a given iris image for identification and a set of enrolled iris images stored in the iris enrollment database.

Next, a description is given of schemes for representing iris images. Before enrollment and storage of obtained iris images and associated iris size information, the obtained iris images may be represented using one of various digital image representation schemes. Digital iris images may be represented through image representation in the spatial domain, Fourier transform, wavelet transform, Radon transform, statistical structuring, PCA (principal component analysis), LDA (linear discriminant analysis), or ICA (independent component analysis). Any other widely known representation schemes may also be utilized.

Such a digital image representation scheme produces a vector or array of real numbers.

Next, a description is given of enrollment and storage of selected iris snapshots. For the person to be enrolled H, members of the set of selected iris snapshots $I(H;C)=\{I(H;c_1), \ldots, I(H;c_k)\}$ are represented in digital representations through a selected digital image representation scheme, and the digital representations and associated iris contraction ratios are stored together in the iris enrollment database. When results of representation of the selected iris snapshots $I(H;c_1), \ldots, I(H;c_k)$ are denoted respectively by $a(H;c_1), a(H;c_2), \ldots$ and $a(H;c_k)$, pairs $(c_1, a(H;c_1)), (c_2, a(H;c_2)), \ldots$ and $(c_k, a(H;c_k))$ are stored for enrollment in the iris enrollment database as iris images for the person to be enrolled H. In the following description, iris snapshots are indicated by initial 'I', and digital representations thereof are indicated by initial 'a'. When $C=\{c_1, \ldots, c_k\}$, the set of $a(H;c_1), a(H;c_2), \ldots$ and $a(H;c_k)$ is denoted by $a(H;C)$ for short.

In another method for storing a set of obtained iris snapshots, one of the iris snapshots is selected as a reference frame, differences between the reference frame and the remaining iris snapshots are computed, and the reference frame and differences are stored for enrollment. Any method that stores multiple iris snapshots for a person to be enrolled may be used in the present invention.

Next, comparison between iris images is described. In the present invention, as multiple iris snapshots are used for each person, a description is given of similarity between iris snapshots, similarity between an iris snapshot and a set of iris snapshots, and similarity between a set of iris snapshots and a set of iris snapshots.

(a) Similarity Between Iris Snapshots

When iris snapshots are represented in vectors using a given representation scheme, similarity between the iris snapshots is obtained by computing similarity between vectors. Similarity between two vectors may be measured using the Minkowski distance such as the Manhattan distance and the Euclidean distance, cosine similarity, or Tanimoto similarity or the like based on correlation. A function for measuring similarity between iris snapshots is denoted by 's'. Similarity between iris snapshots I1 and I2, s(I1, I2), is understood as similarity between their digital representations a1 and a2, s(a1, a2).

(b) Similarity Between an Iris Snapshot and a Set of Iris Snapshots

Similarity between an iris snapshot I and a set of m iris snapshots $U=\{I_1, \ldots, I_m\}$ is defined to be the maximum of m similarities between iris snapshots $s(I, I_1), s(I, I_2), \ldots, s(I, I_m)$. That is, similarity between an iris snapshot I and a set of iris snapshots U is defined by $s(I, U)=\max\{s(I, I_1), s(I, I_2), \ldots, s(I, I_m)\}$.

(c) Similarity Between Iris Snapshot Sets SS

Similarity between iris snapshot sets $U=\{I_1, \ldots, I_m\}$ and $V=\{J_1, \ldots, J_n\}$ is computed by finding a first maximum of $s(I_1, V), s(I_2, V), \ldots, s(I_m, V)$ and finding a second maximum of $s(J_1, U), s(J_2, U), \ldots, s(J_n, U)$, and finding the minimum between the first maximum and second maximum. This similarity measurement function is denoted by SS meaning "single similarity" and is given by $SS(U, V)=\max\{s(I_1, V), \ldots, s(I_m, V)\}$.

By definition of SS, $s(I, U)=SS(\{I\}, U)$. The commutative law does not hold for the SS similarity measurement function. That is, SS(U, V) and SS(V, U) do not always produce the same result.

(d) Similarity Between Iris Snapshot Sets DS

Similarity between iris snapshot sets $U=\{I_1, \ldots, I_m\}$ and $V=\{J_1, \ldots, J_n\}$ is computed by finding a first maximum of $s(I_1, V), s(I_2, V), \ldots, s(I_m, V)$ and finding a second maximum of $s(J_1, U), s(J_2, U), \ldots, s(J_n, U)$, and finding the minimum between the first maximum and second maximum. This similarity measurement function is denoted by DS meaning "double similarity" and is given by DS(U, V)=min{max{s(I1, V), . . . , s(Im, V)}, max{s(J1, U), . . . , s(Jn, U)}}.

The commutative law holds for the DS similarity measurement function. That is, DS(U, V)=DS(V, U).

Next, a description is given of comparison involving iris images for identification. Assume that, for a person to be identified G, a set of iris snapshots I(G;C) is obtained. Assume that iris snapshot sets for persons H1, H2, . . . , Hn enrolled in the iris enrollment database are denoted by I(H1;D1), I(H2;D2), . . . , I(Hn;Dn) and corresponding digital representations are denoted by a(H1;D1), a(H2;D2), . . . , a(Hn;Dn). For authentication or identification, similarity between I(G;C) and I(H1;D1), I(H2;D2), . . . , I(Hn;Dn) is computed.

For authentication, when one of the computed similarities exceeds a preset threshold, authentication is accepted; and otherwise, authentication is rejected. For identification, authentication is performed first, and then an enrolled person associated with the maximum similarity among the computed similarities is selected for identification of G.

Theoretical comparison between an iris image (iris snapshot) for authentication or identification and enrolled iris images (iris snapshots) stored in the iris enrollment database may be performed in various ways described below.

(method 1) Similarity between iris snapshot sets I(G;C) and I(H1;D1), I(H2;D2), . . . , I(Hn;Dn) is computed using the SS similarity measurement function:

SS(I(G;C), I(H1;D1)), SS(I(G;C), I(H2;D2)), . . . , SS(I(G;C), I(Hn;Dn)).

This method is used when the iris contraction ratio set C for G has a relatively small number of elements, that is, when only a small number of iris snapshots is obtained from the person to be identified G.

(method 2) Similarity between iris snapshot sets I(G;C) and I(H1;D1), I(H2;D2), . . . , I(Hn;Dn) is computed as follows using the DS similarity measurement function.

DS(I(G;C), I(H1;D1)), DS(I(G;C), I(H2;D2)), . . . , DS(I(G;C), I(Hn;Dn)).

This method is used when the range of the iris contraction ratio set C is nearly equal to those for enrolled persons.

Next, a description is given of two comparison methods involving iris images for identification. In the above two methods, comparison is made for all the obtained iris snapshots; hence, comparison accuracy is high but a long time may be needed. For enhanced efficiency, approximation methods are provided for the above methods. The core idea for the approximation methods is to select, for each iris contraction ratio c in C, only enrolled iris snapshots having an iris contraction ratio close to c for comparison. Let 'q' be a function for selecting iris snapshots, then q(C, V) denotes a set of iris snapshots selected from an iris snapshot set V with respect to each c in C.

The following functions may be used as the selection function q, numbers are attached to 'q' to distinguish different selection functions.

(a) q1(C, V) is defined to be a set of iris snapshots having an iris contraction ratio closest to each c in C among iris snapshots in V.

(b) q2(C, V) is defined to be a set of iris snapshots whose iris contraction ratio is within the top p percent in closeness to each c in C among iris snapshots in V. Here, p is a preset number.

(c) q3(C, V) is defined to be a set of iris snapshots whose iris contraction ratio is close to each c in C (i.e. distance to c is less than or equal to 'e') among iris snapshots in V. Here, 'e' is a preset number.

Use of the above selection functions may generate six cases in all as approximation schemes for method 1 and method 2.

(method 3) Similarity between iris snapshot sets I(G;C) and Q11=q1(C, I(H1;D1)), Q12=q1(C, I(H2;D2)), . . . , Q1n=q1(C, I(Hn;Dn)) is computed using the SS or DS similarity measurement function as follows.

(method 3-1) Computation of SS(I(G;C), Q11), SS(I(G;C), Q12), . . . , SS(I(G;C), Q1n)

(method 3-2) Computation of DS(I(G;C), Q11), DS(I(G;C), Q12), . . . , DS(I(G;C), Q1n)

(method 4) Similarity between iris snapshot sets I(G;C) and Q21=q2(C, I(H1;D1)), Q22=q2(C, I(H2;D2)), . . . , Q2n=q2(C, I(Hn;Dn)) is computed using the SS or DS similarity measurement function as follows.

(method 4-1) Computation of SS(I(G;C), Q21), SS(I(G;C), Q22), . . . , SS(I(G;C), Q2n)

(method 4-2) Computation of DS(I(G;C), Q21), DS(I(G;C), Q22), . . . , DS(I(G;C), Q2n)

(method 5) Similarity between iris snapshot sets I(G;C) and Q31=q3(C, I(H1;D1)), Q32=q3(C, I(H2;D2)), . . . , Q3n=q3(C, I(Hn;Dn)) is computed using the SS or DS similarity measurement function as follows.

(method 5-1) Computation of SS(I(G;C), Q31), SS(I(G;C), Q32), . . . , SS(I(G;C), Q3n)

(method 5-2) Computation of DS(I(G;C), Q31), DS(I(G;C), Q32), . . . , DS(I(G;C), Q3n)

Figure 5:
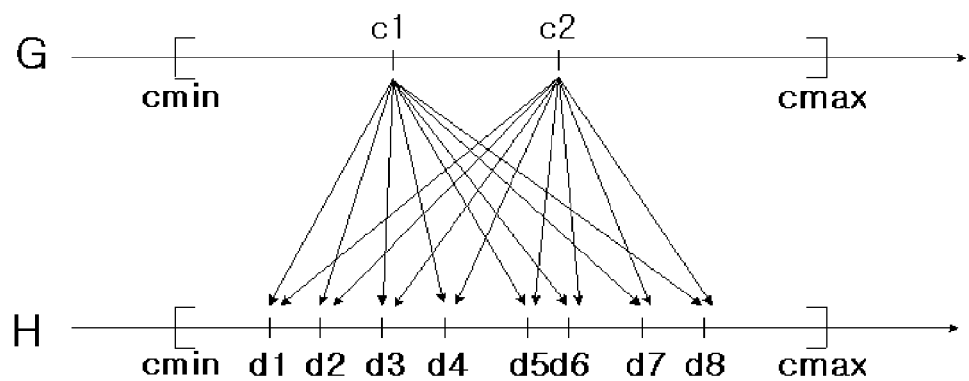
FIGS. 5, 6, 7 and 8 illustrate comparison between iris images for identification and enrolled iris images according to the present invention.

FIGS. 5 to 8 illustrate comparison between iris snapshots using the above described methods, where iris snapshots with iris contraction ratios c1 and c2 are captured for a person to be authenticated or identified G and iris snapshots with iris contraction ratios d1, d2, . . . , d8 are captured for an enrolled person H. FIG. 5 illustrates comparison between iris snapshots using method 1 or method 2, in which case comparison is made for all related iris snapshots. In FIG. 5, similarity is computed through 16 comparisons.

Figure 6:
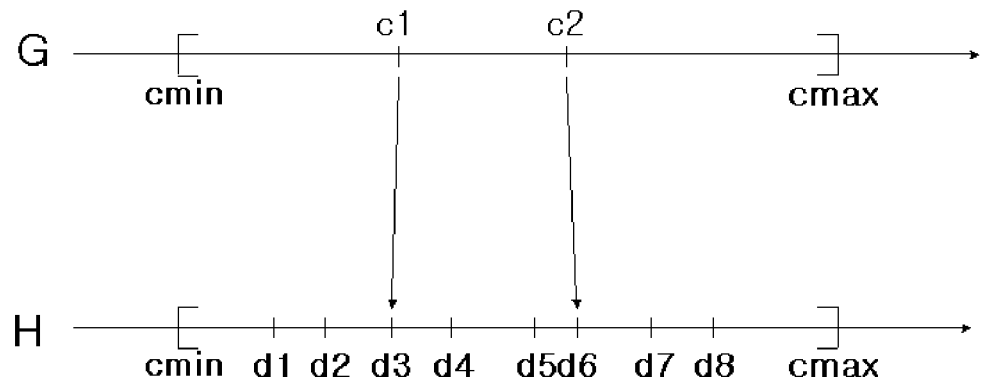
Figure 7:
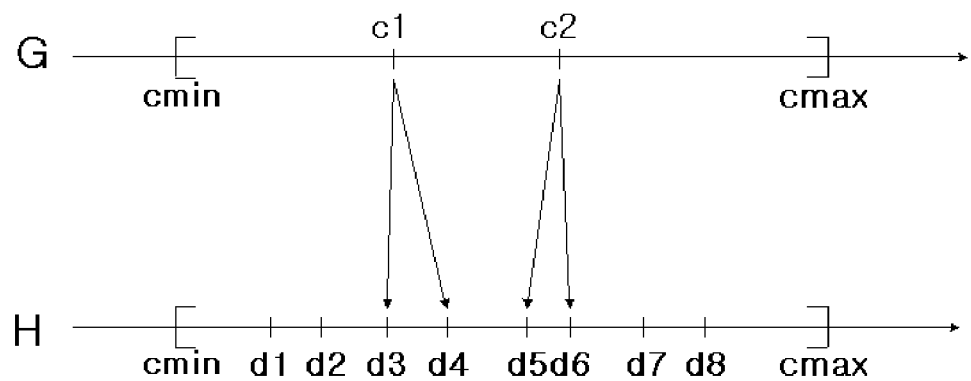

FIG. 6 illustrates comparison between iris snapshots using method 3. In FIG. 6, for iris snapshots I(G;c1) and I(G;c2) of G, iris snapshots I(H;d3) and I(H;d6) of H having an iris contraction ratio closest to c1 and c2 are selected, and I(G;c1) is compared with I(H;d3) and I(G;c2) is compared with I(H;d6). FIG. 7 illustrates comparison between iris snapshots using method 4. In FIG. 7, for iris snapshots I(G;c1) and I(G;c2) of G, two iris snapshots of H having an iris contraction ratio closest to c1 and two iris snapshots of H having an iris contraction ratio closest to c2 are selected (that is, I(H;d3) and I(H;d4) are selected for I(G;c1), and I(H;d5) and I(H;d6) are selected for I(G2;c2)), and four comparisons are made.

Figure 8:
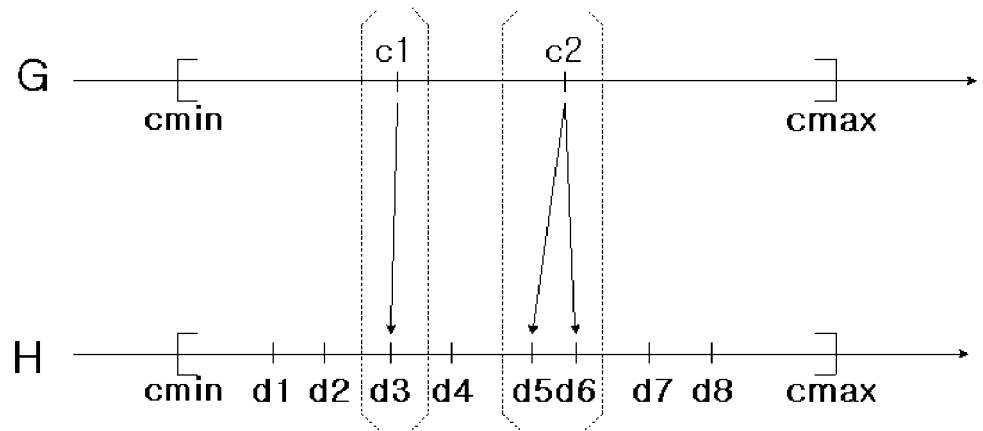

Finally, FIG. 8 illustrates comparison between iris snapshots using method 5. In FIG. 8, for iris snapshots I(G;c1) and I(G;c2) of G, iris snapshots of H whose iris contraction ratio is within a preset distance to c1 or c2 are selected for comparison. I(H;d3) is selected for I(G;c1), and I(H;d5) and I(H;d6) are selected for I(G;c2).

In a locking system or authentication system at which the iris recognition device of the present invention is installed, a user who wishes to unlock the locking system or to be authenticated by the authentication system has to enter an iris image for identification captured by a camera installed in the iris recognition device. In this case, according to the site where the iris recognition device is installed, iris images for identification may be captured under various illumination conditions. Many iris images for enrollment may also have been captured under various illumination conditions and stored in an iris enrollment database. After an iris image for identification is captured, it is compared with enrolled iris images having an iris contraction ratio most similar to that of the iris image for identification among many iris images enrolled in the iris enrollment database. Hence, the iris recognition device of the present invention may exhibit high iris recognition accuracy.

The iris recognition method of the present invention is configured to give admission permission or access rights to a user by unlocking a locking system when an iris image of the user captured by a camera installed in front of the iris recognition device is determined to be identical within a given range to one or more enrolled iris images by comparing the captured iris image with many iris images having different iris contraction ratios stored in the iris enrollment database, and to disallow further access when the captured iris image does not match any enrolled iris image.

Figure 9:
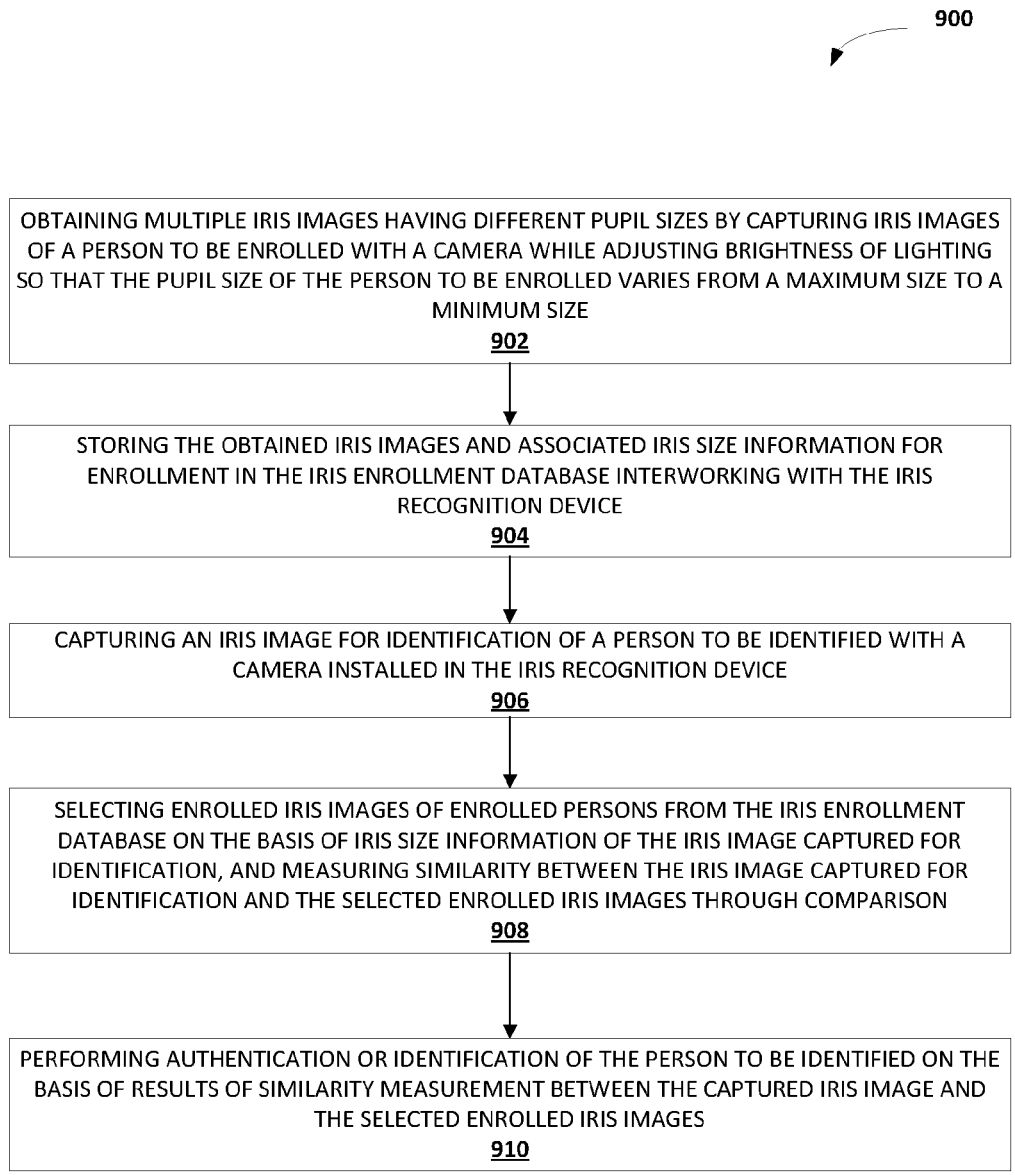
FIG. 9 illustrates, in a flow chart, one embodiment of an iris recognition method.
Figure 10:
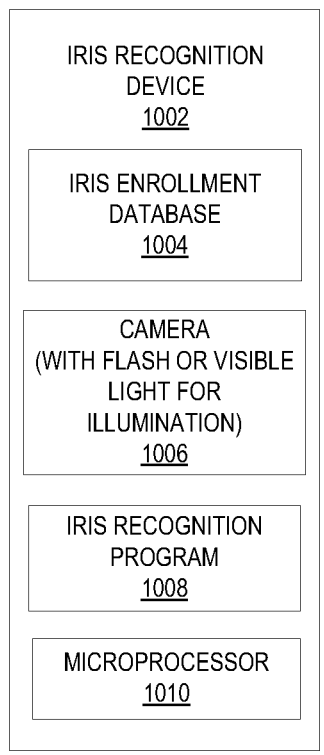
FIG. 10 illustrates, in a block diagram, one embodiment of an iris recognition device performing the method disclosed by FIG. 9.

To sum up, the iris recognition method 900 of FIG. 9 of the present invention, which uses a camera 1006 of FIG. 10, a microprocessor 1010 of FIG. 10, an iris enrollment database 1004 of FIG. 10 and an iris recognition program 1008 of FIG. 10 and considers pupil size variations for iris recognition, may include: a) obtaining multiple iris images having different pupil sizes by capturing iris images of a person to be enrolled with a camera 1006 of FIG. 10 while adjusting brightness of lighting so that the pupil size of the person to be enrolled varies from a maximum size to a minimum size, as shown in block 902 of FIG. 9; b) storing the obtained iris images and associated iris size information for enrollment in the iris enrollment database 1004 of FIG. 10 interworking with the iris recognition device 1002 of FIG. 10, as shown in block 904 of FIG. 9; c) capturing an iris image for identification of a person to be identified with a camera 1006 of FIG. 10 installed in the iris recognition device 1002 of FIG. 10, as shown in block 906 of FIG. 9; d) selecting enrolled iris images of enrolled persons from the iris enrollment database 1004 of FIG. 10 on the basis of iris size information of the iris image captured for identification, and measuring similarity between the iris image captured for identification and the selected enrolled iris images through comparison, as shown in block 908 of FIG. 9; and e) performing authentication or identification of the person to be identified on the basis of results of similarity measurement between the captured iris image and the selected enrolled iris images, as shown in block 910 of FIG. 9.

Selecting and measuring similarity may include capturing a single iris image for identification of a person to be identified with the camera, selecting one or more enrolled iris images from the iris enrollment database on the basis of iris size information of the iris image captured for identification, and comparing the iris image captured for identification with the selected one or more enrolled iris images in a one-to-one manner or one-to-many manner.

The iris size information of iris images for enrollment and iris image for identification may be determined according to an iris contraction ratio set $\{r(t)/R(t)\}$ of values obtained by dividing the inner iris radius by the outer iris radius for an angle t in a given range.

Determination based on the iris size information of iris images for enrollment and iris image for identification may be made according to a representative value (referred to as a representative iris contraction ratio) derived from the iris contraction ratio set $\{r(t)/R(t)\}$.

Selecting and measuring similarity may include one of selecting all enrolled iris images of each enrolled person without regard to the representative iris contraction ratio of the iris image for identification and comparing the iris image for identification with the selected iris images, selecting one or more enrolled iris images of each enrolled person having a representative iris contraction ratio closest to the representative iris contraction ratio of the iris image for identification and comparing the iris image for identification with the selected iris images, and selecting one or more enrolled iris images of each enrolled person having a representative iris contraction ratio belonging to a preset range containing the representative iris contraction ratio of the iris image for identification and comparing the iris image for identification with the selected iris images.

To sum up, the iris recognition device of the present invention, which is equipped with a camera, microprocessor, iris enrollment database and iris recognition program and considers pupil size variations due to changes in intensity of lighting for iris recognition, may include: a) a means, installed in the iris recognition device, to obtain multiple iris images having different pupil sizes by capturing iris images of a person to be enrolled with a camera while adjusting brightness of lighting so that the pupil size of the person to be enrolled varies from a maximum size to a minimum size; b) a means, installed in the iris recognition device, to store the obtained iris images and associated iris size information for enrollment in the iris enrollment database; c) a means, installed in the iris recognition device, to capture an iris image for identification of a person to be identified with the camera installed in the iris recognition device; a means, installed in the iris recognition device, to select enrolled iris images of each enrolled person from the iris enrollment database on the basis of iris size information of the iris image captured for identification, and measure similarity between the iris image captured for identification and the selected enrolled iris images through comparison; and e) a means, installed in the iris recognition device, to perform authentication or identification of the person to be identified on the basis of results of similarity measurement between the captured iris image and the selected enrolled iris images.

The means to select and measure similarity may capture a single iris image for identification of a person to be identified with the camera, select one or more enrolled iris images from the iris enrollment database on the basis of iris size information of the iris image captured for identification, and compare the iris image captured for identification with the selected one or more enrolled iris images in a one-to-one manner or one-to-many manner.

The iris size information of iris images for enrollment and iris image for identification may be determined according to an iris contraction ratio set $\{r(t)/R(t)\}$ of values obtained by dividing the inner iris radius by the outer iris radius for an angle t in a given range.

Determination based on the iris size information of iris images for enrollment and iris image for identification may be made according to a representative value derived from the iris contraction ratio set $\{r(t)/R(t)\}$.

The means to select and measure similarity may perform selection and similarity measurement through one of selecting all enrolled iris images of each enrolled person without regard to the representative iris contraction ratio of the iris image for identification and comparing the iris image for identification with the selected iris images, selecting one or more enrolled iris images of each enrolled person having a representative iris contraction ratio closest to the representative iris contraction ratio of the iris image for identification and comparing the iris image for identification with the selected iris images, and selecting one or more enrolled iris images of each enrolled person having a representative iris contraction ratio within a preset range containing the representative iris contraction ratio of the iris image for identification and comparing the iris image for identification with the selected iris images.

INDUSTRIAL APPLICABILITY

The present invention provides an iris recognition device and method using multiple iris images having different pupil sizes, wherein, to improve iris recognition accuracy in consideration of the iris region changing with pupil size variations in response to changes in intensity of lighting, multiple iris images having different pupil sizes are obtained by capturing iris images of a person to be enrolled with a camera while adjusting brightness of lighting so that the pupil size of the person to be enrolled varies from about a maximum size to about a minimum size, and the obtained iris images and associated iris size information are stored together in an iris enrollment database interworking with the iris recognition device. As the present invention can enhance iris recognition accuracy, it possesses high industrial applicability.

What is claimed is:

1. An iris recognition method, which considers pupil size variations due to changes in at least one intensity of lighting so as to enhance iris recognition accuracy, the iris recognition method comprising:
    obtaining multiple iris images having different pupil sizes by capturing iris images of a person to be enrolled with a camera installed in an iris recognition device while adjusting brightness of lighting so that the pupil size of the person to be enrolled varies from a maximum size to a minimum size, wherein the iris recognition device performs the iris recognition method and wherein the iris recognition device comprises the camera, a microprocessor, an iris enrollment database, and an iris recognition program;
    storing the obtained iris images and associated iris size information for enrollment in the iris enrollment database that is interworking with the iris recognition device;
    capturing an iris image for identification of a person to be identified with the camera installed in the iris recognition device;
    selecting enrolled iris images of each enrolled person from the iris enrollment database based on iris size information of the iris image captured for identification, and measuring a similarity between the iris image captured for identification and the selected enrolled iris images through comparison, wherein the iris size information of iris images for enrollment and the iris image for identification is determined according to an iris contraction ratio set $\{r(t)/R(t)\}$ of values obtained by dividing an inner iris radius of a particular iris image by an outer iris radius of the particular iris image for an angle t in a given range; and
    performing authentication or identification of the person to be identified based on results of the similarity measurement between the captured iris image and the selected enrolled iris images.

2. The iris recognition method of claim 1, wherein selecting and measuring similarity comprises capturing a single iris image for identification of a person to be identified with the camera, selecting one or more enrolled iris images from the iris enrollment database on the basis of iris size information of the iris image captured for identification, and comparing the iris image captured for identification with the selected one or more enrolled iris images in a one-to-one manner or one-to-many manner.

3. The iris recognition method of claim 1, wherein the determination based on the iris size information of iris images for enrollment and the iris image for identification is made according to a representative value derived from the iris contraction ratio set $\{r(t)/R(t)\}$.

4. The iris recognition method of claim 3, wherein selecting and measuring similarity comprises one of selecting all enrolled iris images of each enrolled person without regard to the representative iris contraction ratio of the iris image for identification and comparing the iris image for identification with the selected iris images, selecting one or more enrolled iris images of each enrolled person having a representative iris contraction ratio closest to the representative iris contraction ratio of the iris image for identification and comparing the iris image for identification with the selected iris images, and selecting one or more enrolled iris images of each enrolled person having a representative iris contraction ratio within a preset range containing the representative iris contraction ratio of the iris image for identification and comparing the iris image for identification with the selected iris images.

5. The iris recognition method of claim 4, wherein the representative iris contraction ratio for the iris contraction ratio set $\{r(t)/R(t)\}$ is obtained by selecting one or more values from the iris contraction ratio set and averaging the selected values, wherein, when both the inner iris boundary and outer iris boundary are modeled by circles, the representative iris contraction ratio is set to a value obtained by dividing the inner iris radius by the outer iris radius (r/R), and wherein, when both the inner iris boundary and outer iris boundary are modeled by ellipses with major axis length 'a' and minor axis length 'b' for the inner iris boundary and with major axis length 'A' and minor axis length 'B' for the outer iris boundary, the representative iris contraction ratio is set to the average of the major axis length ratio and the minor axis length ratio.

6. The iris recognition method of claim 1, wherein measuring similarity between the iris image captured for identification and the selected enrolled iris images comprises representing each iris image in a digital representation using one of digital image representation schemes based on spatial-domain image representation, Fourier transform, wavelet transform, Radon transform, statistical structuring, PCA, LDA and ICA, and measuring similarity between corresponding digital representations.

7. The iris recognition method of claim 6, wherein measuring similarity between digital representations of iris images is conducted using one of the Minkowski distance including the Manhattan distance and the Euclidean distance, cosine similarity, and Tanimoto similarity.

8. An iris recognition device, which is considers pupil size variation due to changes in at least one intensity of lighting so as to enhance iris recognition accuracy, the iris recognition device being configured to perform an iris recognition method, the iris recognition method comprising:
    obtaining multiple iris images having different pupil sizes by capturing iris images of a person to be enrolled with a camera installed in the iris recognition device while adjusting brightness of lighting so that the pupil size of the person to be enrolled varies from a maximum size to a minimum size, wherein the iris recognition device performs the iris recognition method and wherein the iris recognition device comprises the camera, a microprocessor, an iris enrollment database, and an iris recognition program;
    storing the obtained iris images and associated iris size information for enrollment in the iris enrollment database that is interworking with the iris recognition device;
    capturing an iris image for identification of a person to be identified with the camera installed in the iris recognition device;

selecting enrolled iris images of each enrolled person from the iris enrollment database on the basis of based on iris size information of the iris image captured for identification, and measuring a similarity between the iris image captured for identification and the selected enrolled iris images through comparison, wherein the iris size information of iris images for enrollment and the iris image for identification is determined according to an iris contraction ratio set $\{r(t)/R(t)\}$ of values obtained by dividing an inner iris radius of a particular iris image by an outer iris radius of the particular iris image for an angle t in a given range; and performing authentication or identification of the person to be identified on the basis of based on results of the similarity measurement between the captured iris image and the selected enrolled iris images.

9. The iris recognition device of claim 8, wherein the iris recognition device is configured to perform the selection of the enrolled images and the similarity measurement by capturing a single iris image for identification of a person to be identified with the camera, selecting one or more enrolled iris images from the iris enrollment database on the basis of iris size information of the iris image captured for identification, and comparing the iris image captured for identification with the selected one or more enrolled iris images in a one-to-one manner or one-to-many manner.

10. The iris recognition device of claim 8, wherein the determination based on the iris size information of iris images for enrollment and the iris image for identification is made according to a representative value derived from the iris contraction ratio set $\{r(t)/R(t)\}$.

11. The iris recognition device of claim 10, wherein the iris recognition device is configured to perform the selection of the enrolled images and the similarity measurement by at least one of: selecting all enrolled iris images of each enrolled person without regard to the representative iris contraction ratio of the iris image for identification and comparing the iris image for identification with the selected iris images, selecting one or more enrolled iris images of each enrolled person having a representative iris contraction ratio closest to the representative iris contraction ratio of the iris image for identification and comparing the iris image for identification with the selected iris images, or selecting one or more enrolled iris images of each enrolled person having a representative iris contraction ratio within a preset range containing the representative iris contraction ratio of the iris image for identification and comparing the iris image for identification with the selected iris images.

12. The iris recognition device of claim 11, wherein the representative iris contraction ratio for the iris contraction ratio set $\{r(t)/R(t)\}$ is obtained by selecting one or more values from the iris contraction ratio set and averaging the selected values, wherein, when both the inner iris boundary and outer iris boundary are modeled by circles, the representative iris contraction ratio is set to a value obtained by dividing the inner iris radius by the outer iris radius (r/R), and wherein, when both the inner iris boundary and outer iris boundary are modeled by ellipses with major axis length 'a' and minor axis length 'b' for the inner iris boundary and with major axis length 'A' and minor axis length 'B' for the outer iris boundary, the representative iris contraction ratio is set to the average of the major axis length ratio and the minor axis length ratio.

13. The iris recognition device of claim 8, wherein similarity measurement between the iris image captured for identification and the selected enrolled iris images is conducted by representing each iris image in a digital representation using one of digital image representation schemes based on spatial-domain image representation, Fourier transform, wavelet transform, Radon transform, statistical structuring, PCA, LDA and ICA, and measuring similarity between corresponding digital representations.

14. The iris recognition device of claim 13, wherein similarity measurement between digital representations of iris images is conducted using one of the Minkowski distance including the Manhattan distance and the Euclidean distance, cosine similarity, and Tanimoto similarity.

15. The iris recognition device of claim 8, wherein the camera used to obtain multiple iris images having different pupil sizes captures iris images of the person to be enrolled utilizing flash or visible light for illumination so as to vary the pupil size of the person to be enrolled.

* * * * *